United States Patent Office 3,510,700
Patented May 5, 1970

3,510,700
DEVICE FOR FEEDING COOLANT TO HOLLOW CONDUCTORS OF STATOR BAR WINDING IN ELECTRIC MACHINES
Nikolai Grigorievich Grinchenko, Ulitsa Vatutina 16/25; Oleg Borisovich Gradov, Ulitsa Kosiora 6, kv. 1; Vasily Semenovich Kildishev, Ulitsa Plekhanovskaya 41/43, kv. 55; Vladimir Vasilievich Kramarenko, Ulitsa Plekhanovskaya 41/23, kv. 24; Moisei Abramovich Katsnelson, Ulitsa III Internatsionala 7, kv. 50; Ivan Eliseevich Makogonenko, Ulitsa Metallistov 8, kv. 90; Mikhailovich Rudnitsky, Ulitsa Mira 100, kv. 91; Lazar Yankelevich Stanislavsky, Ulitsa Mayakovskogo 11, kv. 24; Mikhail Iosifovich Semernin, Ulitsa Kultury 16, kv. 64; Alexandr Abramovich Chigirinsky, Ulitsa Kuibysheva 11, kv. 8; and Andrei Leontievich Shulga, Ulitsa Mokhnachanskaya 12, all of Kharkov, U.S.S.R.
Filed Feb. 24, 1969, Ser. No. 801,676
Int. Cl. H02k 3/24
U.S. Cl. 310—54                                    2 Claims

ABSTRACT OF THE DISCLOSURE

Disclosed is a device for feeding coolant to the hollow stator windings of a dynamoelectric machine. The hollow conductors are gripped by a sleeve within a hollow metal tip, the tip being jointed with a connecting pipe.

The present invention relates generally to the field of electric-machine building and more particularly to devices for feeding coolant to hollow conductors of stator bar windings in high-power electric machines.

Known in the art is a device employed for feeding coolant such as water to the hollow conductors of the stator bar windings in electric machines, said devices comprising a hollow endpiece or tip tightly solder-joined with the ends of both hollow and solid bar conductors so that a free space or gap is left in between the ends of the bar conductors and the end face of the tip, for the coolant to pass through a connecting pipe soldered to the tip.

However, said device, has certain disadvantages such as: inaccessibility of the passages of hollow conductors for being inspected and checked for permeability and hydraulic resistance; difficulties encountered in making some components such as tight joint of the tip with the ends of great number of conductors during soldering; high labour consumption of technological repair jobs.

It is an object of the present invention to eliminate the disadvantages mentioned above.

It is a main object of the present invention to provide a reliable and tight construction of a device for feeding coolant to hollow conductors of stator bar winding in electric machines.

Said object is accomplished due to the fact that in a device for feeding coolant to the hollow conductors of the stator bar winding in an electric machine, comprising a hollow tip electrically connected to both the solid and hollow conductors located thereinside and made fast to the connecting pipe for feeding coolant, according to the invention said hollow conductors of the bar winding are brought outside the tip into the connecting pipe and tightly held in position in a sleeve provided at the tip end face wherefrom said hollow conductors run outside.

A sealing gasket is expedient to be placed in between said connecting pipe and said sleeve.

Such an arrangement ensures a highly reliable and tight joint at the place of coolant feeding to the bar hollow conductors; increases vibration-proofness of the joints; is simple in assembling and disassembling; has the minimum number of tight joints; provides ready and convenient access to the ends of each conductors to check their passages for permeability and for hydraulic resistance.

Given below is a description of exemplary embodiments of the present invention with due reference to the accompanying drawings, wherein.

Figure 1:
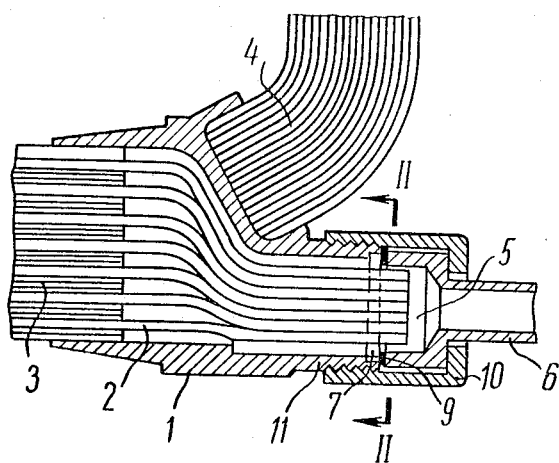
FIG. 1 represents a longitudinal section view of a device for feeding coolant to hollow conductors of stator bar winding in electrical machines, according to the invention.
Figure 2:
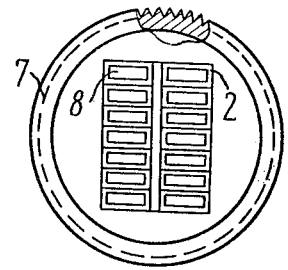
FIG. 2 is a section on the line II—II in FIG. 1.

Now referring to FIGS. 1 and 2, the device for feeding coolant is essentially a hollow metal endpiece or tip 1 which houses hollow and solid conductors of the stator winding bar indicated at 2 and 3 respectively. The tip 1 is electrically connected to the conductors 2 and 3 of the bar by means of brazing. Besides, the tip is provided with a pack of flexible contact lamels welded thereto for electric connection with the adjacent bar.

The hollow bar conductors 2 are brought outside the tip into an interior of a detachable connecting pipe 6 and tightly fastened therein. Provision of a free access to the ends of the hollow conductors makes it possible to check passages 8 of each of the hollow conductors for permeability and for hydraulic resistance, as well as simplifies and facilitates the repairing technique.

The connecting pipe 6 is tightly jointed with a sleeve 7 by means of a sealing gasket 9 and a union nut 10 connected with a threaded end 11 of the tip 1.

Provision of the sleeve 7 renders the possibility for the threaded end 11 of the tip 1 to be made of a strong material thus conducing to a more dependable joint of the connecting pipe 6 with the tip 1; ensures high-level technological features of repair jobs, since the correction of the defects of brazing in the joints of the hollow conductors 2 with the sleeve 7, is attainable by merely heating-up the sleeve and not the tip, as well as makes it possible to replace the sleeve 7 without disjointing the tip 1 from the bar.

Figure 3:
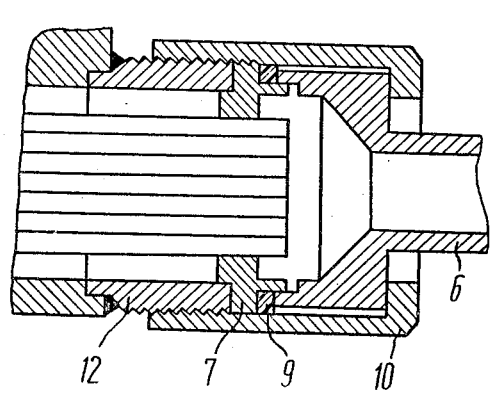
FIG. 3 represents the tip with a tight intermediate sleeve.

FIG. 3 is a schematic representation of a possible constructional variant of the threaded end 11 of the tip 1 by making use of an intermediate sleeve 12 made of a material stronger than that of the tip, whereby the tightness of the joint, as well as the reliability in operation of the entire device are substantially improved.

What is claimed is:

1. A device for feeding coolant to hollow conductors of stator bar windings in electric machines, comprising: a hollow metal tip having an end face; a sleeve mounted at the end face of the tip solid and hollow bar conductors electrically connected to said tip and located thereinside; a connecting pipe having a cavity and jointed with said tip to feed coolant thereto; said hollow bar conductors extending outside said tip into the cavity of said connecting pipe and being tightly held in the sleeve mounted at the end face of the tip wherefrom said hollow conductors extend outside.

2. A device as claimed in claim 1, comprising a sealing gasket installed in between said connecting pipe and said sleeve.

References Cited

UNITED STATES PATENTS

| | | | |
|---|---|---|---|
| 1,448,700 | 3/1923 | Seidner | 310—54 |
| 1,853,646 | 4/1932 | Von Kando | 310—54 |
| 3,046,424 | 7/1962 | Tudge | 310—61 |
| 3,320,447 | 5/1967 | Banchieri | 310—61 X |
| 3,363,122 | 1/1968 | Hoover et al. | 310—54 X |
| 3,398,304 | 8/1968 | Heard et al. | 310—61 |

DONOVAN F. DUGGAN, Primary Examiner

U.S. Cl. X.R.

310—59